(12) United States Patent
McReynolds

(10) Patent No.: US 7,411,867 B2
(45) Date of Patent: Aug. 12, 2008

(54) STABLE COMPOSITE CLOCK

(75) Inventor: Stephen R. McReynolds, West Chester, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 804 days.

(21) Appl. No.: 10/967,405

(22) Filed: Oct. 18, 2004

(65) Prior Publication Data

US 2005/0089128 A1    Apr. 28, 2005

Related U.S. Application Data

(60) Provisional application No. 60/514,784, filed on Oct. 27, 2003.

(51) Int. Cl.
*G04B 47/00* (2006.01)
*G04C 11/00* (2006.01)
*G04F 5/00* (2006.01)
*H03L 7/00* (2006.01)
*G06F 15/00* (2006.01)

(52) U.S. Cl. .............................. 368/10; 368/46; 368/47; 368/156; 331/46; 702/75; 702/176; 702/190

(58) Field of Classification Search .................. 368/10, 368/46, 47, 52, 155–156; 331/2, 46; 702/75, 702/176, 190
See application file for complete search history.

(56) References Cited

U.S. PATENT DOCUMENTS

| | | | | |
|---|---|---|---|---|
| 5,155,695 | A | * | 10/1992 | Stein ........................... 702/178 |
| 5,315,566 | A | * | 5/1994 | Stein ............................ 368/46 |
| 5,666,330 | A | * | 9/1997 | Zampetti ...................... 368/47 |
| 5,697,082 | A | * | 12/1997 | Greer et al. ................... 455/255 |
| 6,651,031 | B2 | * | 11/2003 | Akopian ...................... 702/178 |
| 6,957,358 | B1 | * | 10/2005 | Sundaresan et al. ......... 713/600 |
| 6,958,951 | B2 | * | 10/2005 | Duven .......................... 368/10 |
| 2002/0018402 | A1 | * | 2/2002 | Egle et al. ..................... 368/46 |
| 2003/0110015 | A1 | * | 6/2003 | Akopian ...................... 702/191 |
| 2003/0132878 | A1 | * | 7/2003 | Devereux et al. ......... 342/357.06 |
| 2006/0192625 | A1 | * | 8/2006 | Sorrells et al. ............... 331/158 |
| 2006/0255281 | A1 | * | 11/2006 | Lal et al. ................. 250/370.11 |

\* cited by examiner

*Primary Examiner*—Vit W Miska
(74) *Attorney, Agent, or Firm*—Duane Morris LLC

(57) ABSTRACT

Apparatus and method for producing a composite clock signal with optimized stability characteristics from individual clocks which have different stabilities or variances. The composite clock signal includes weighted individual clock signals. In a first (PPN) case, an optimum composite clock is a scale-factor-weighted linear combination of clock signals. In another (non-PPN) case, the optimum stable composite clock is the output of a linear filter of the input clocks signals. Both the phases and frequencies of the individual clocks over time are estimated.

3 Claims, 8 Drawing Sheets

STABLE COMPOSITE CLOCK

RELATED APPLICATIONS

This application claims the benefit of the priority data of U.S. Provisional Patent application Ser. No. 60/514,784, filed Oct. 27, 2003.

FIELD OF THE INVENTION

This invention relates to composite clocks, and more particularly to combination of the outputs of multiple clocks to produce a more stable time reference.

BACKGROUND OF THE INVENTION

The Global Positioning System (GPS) has become very valuable for communication, navigation, and for geolocation. The GPS system includes about twenty-four spacecraft in 12-hour orbits at about 11000 nautical miles above the Earth. Each spacecraft includes a precision clock and a signal transmitter. A GPS receiver receives signals from several GPS spacecraft and measures the time of emission of the signal from each spacecraft. It then uses this information, together with knowledge of the location of the GPS satellites derived from the GPS signal, to calculate its own geolocation and time. Navigation systems exploit this knowledge to control vehicles and to target weapons. The GPS system also supports the synchronization of network systems such as communication systems.

One important aspect of GPS performance is the ability to predict the GPS SV (space vehicle) position and clock state, as the broadcast message is based upon prediction. Currently the prediction interval is about 24 hours. The dominant error in the range prediction error is the instability of the SV's clock. By enhancing the stability of the SV clock, range prediction errors are reduced and the accuracy of the GPS system is improved.

A clock includes a periodic process and a counter. A simple clock produces a number in a register, which number corresponds to how many counts or how many periodic events have taken place since the clock was initialized. Most physical processes are not perfectly regular in time due to small physical noise processes that vary over time. Hence, clocks will deviate from "perfect" time, and the difference between absolute time and time measured by a clock will behave as a random process and the variation of the error will grow with time.

Clock stabilities have been characterized classically by Allan variances. To measure the Allan variances at specific time samples ($\Delta t$), a sequence of phase errors ($x_k$) are measured (the difference between phase readings between two clocks, one being a more stable clock standard). This is used to compute a sequence of double differences of phase errors ($a_k = x_{k+2} - 2x_{k+1} + x_k$). Then the Allan variance, avar, is computed using the following formula:

$$a\text{var}(\Delta t) = \frac{1}{2\Delta t^2 n} \sum_{k=1}^{n} a_k^2 \qquad (1)$$

To compute the Allan variance curve, the value of the Allan variance is computed for a whole range of values of ($\Delta t$). Typical Allan variance curves for three clocks are given in FIG. 2, plotted in log-log space. One should notice there are three regions of the curve with different characteristics. For shorter sample times the curve has a negative 1 slope; for long sample times the curve has a +1 slope. For intermediate sample times, the curve is flat. Each of these regions is due to a different noise source: phase random walk, flicker, and frequency random walk, respectively. The stability characteristics are related to the ability to predict clock states. The following relationship holds between prediction errors due to these error sources and the Allan variance curve:

$$P(\Delta t) = a\,\text{var}(\Delta t)\Delta t^2 \qquad (2)$$

Thus it can be seen the ability to have low clock prediction errors is related to low stability characteristics.

To exploit clocks in an application, such as GPS, it is necessary to generate state space representation of clocks. The minimal state space includes two states: phase and frequency. In certain clocks the center frequency changes linearly with time. For those clocks, a third state, drift (the derivative of frequency) may be modeled. As part of the modeling process, statistics of process noise are modeled to match the stability characteristics. For example, the model:

$$\begin{bmatrix} \dot{x} \\ \dot{y} \end{bmatrix} = \begin{bmatrix} 0 & 1 \\ 0 & 0 \end{bmatrix} \begin{bmatrix} x \\ y \end{bmatrix} + \begin{bmatrix} u \\ v \end{bmatrix} \qquad (3)$$

Represents a clock with phase random walk u and frequency random walk v (x is the phase error; y is the frequency error). By choosing the covariances of u and v properly, the model will match the Allan deviation curves for those noise sources. There is no simple model that will generate flicker noise; such models have developed and usually involve more states (e.g. Van Dierendonck developed a model with a third state). The most general two state model is given by process noise with the covariance:

$$Q = \begin{bmatrix} q_{11} & q_{12} \\ q_{21} & q_{22} \end{bmatrix} \qquad (4)$$

Q is a positive definite 2×2 matrix. Using the empirical definition of "Allan variance," the Allan deviation is given by $$a\,\text{var}(\Delta t) = q_{11}/\Delta t + q_{22}\Delta t \qquad (5)$$

Notice there is no term corresponding to flicker noise. If the relationship between prediction errors and Allan variances is used, then $$a\,\text{var}(\Delta t) = q_{11}/\Delta t + q_{12} + q_{22}\Delta t \qquad (6)$$

This does include a term that looks like flicker noise. This term is not true flicker, as it is not an additional noise source but is due to a correlation between phase and frequency random walks. It can be used to help compensate for flicker noise but is limited by the constraint $$|q_{12}| \leq \sqrt{q_{11}q_{22}} \qquad (7)$$

due to the positive definiteness of Q.

Prior to 1990, the GPS Master Control Station (GPS MCS) employed the "master clock" for time keeping. In the master clock implementation, a single clock is used to define time, and all other clocks are synchronized to the master clock through tracking these clocks from ground stations. Due to random variations and anomalies in the master clock, the master clock concept had its vulnerabilities. One source of these vulnerabilities of the GPS system is the necessity to keep GPS time close to coordinated universal time (UTC) time, which is Greenwich Mean Time updated with leap seconds. When the difference between the master clock and UTC became too large, then it was necessary to switch the master clock function from one clock to another. Changing the master clock introduced a discontinuity into the GPS service, disrupting the service to those receivers that were in operation at the time of the discontinuity.

In the implementation of the master-clock concept for the GPS, each clock is modeled using parameters in the above models. Since time relative to the master clock is solved for, the relative clock model is solved for. This requires for every clock adding its process noise covariance and the master noise process noise covariance in order to provide the process noise of a single clock. Since all clocks have the same reference, it is necessary to also represent the correlation between the clocks. Thus for example, let $Q_1$ and $Q_2$ represent the process noise for clocks 1 and 2. Let $Q_M$ represent the process noise for the master clock. The process noise matrix for clocks 1 and 2 relative to the master clock will be given by $$Q = \begin{bmatrix} Q_1 + Q_M & Q_M \\ Q_M & Q_2 + Q_M \end{bmatrix} \quad (8)$$

In the GPS filter, clocks are only a subset of physical systems that must be estimated. States must be included to model the positions of the GPS orbits, etc. In the standard Kalman filter, two steps are included: a time update and a measurement update. The time update equation is given by:

$$\overline{P}_{k+1} = \Phi_k P_k \Phi_k^T + Q_k \quad (9)$$

$$\vec{\overline{x}}_{k+1} = \Phi_k \vec{x}_k \quad (10)$$

P's represent covariance of that state estimates (x). $Phi_k$ ($\Phi_k$) represents the global transition matrix ($\Phi$ for a single clock is given by Equation 37); and Q represents global process noise covariance. These matrices are formed from the individual clocks by forming block diagonal matrices by concatenating the matrices belonging to individual clocks. Equations for these quantities for individual clocks, which constitute a subset of the global quantities, have been presented. Other equations are needed for other states to fill out the global matrices. To complete equations for the GPS Kalman filter specification it is necessary to also specify the measurement processing. Measurements are of time delays between signals being emitted from one source and being received at a receiver. The states of clocks of the source and the emitter appear as states in the observation equation, which have the standard linearized form as:

$$\Delta z_{k+1} = H_{k+1} \Delta x_{k+1} + w_{k+1} \quad (11)$$

$\Delta z_{k+1} = \Delta z_{k+1} - h(x_{k+1}) =$ predicted residuals
$\Delta x_{k+1} =$ state space correction (to be computed by the filter)
$w_{k+1} =$ measurement noise.

$$H_{k+1} = \frac{\partial h(x)}{\partial x}\bigg|_{x=x_{k+1}} = \text{measurement Jacobian}$$

In the filter, it is assumed that measurement errors are zero-mean white noise with a covariance matrix given by $R_{k+1}$. In terms of these quantities, the Kalman filter update is given by $$\Delta x_{k+1} = K_{k+1} \Delta z_{k+1} \quad (12)$$

where $$K_{k+1} = \overline{P}_{k+1} H_{k+1}^T [H_{k+1} \overline{P}_{k+1} H_{k+1}^T + R_{k+1}]^{-1} \quad (13)$$

This correction is added to the predicted state to provide an updated estimate state:

$$\vec{x}_{k+1} = \vec{\overline{x}}_{k+1} + \Delta x_{k+1} \quad (14)$$

The filter covariance is updated according to the equations $$P_{k+1} = \overline{P}_{k+1} - K_{k+1} H_{k+1} \overline{P}_{k+1} \quad (15)$$

The above equations are prior art known as "Kalman filter". Various versions have been implemented in order to provide improved numerical stability. Bierman has discussed such methods at length (see "Factorization Methods for Discrete Sequential Estimation" (Academic Press, 1977)). It is well known that for the Kalman filter (or factorized methods) to work, it is usually required that all states be observable. In the GPS application (or other clock operations), since all measurements are time differences, there is no way to observe all clocks as independent states. This leads to the introduction of the "master clock" discussed above. In the master clock implementation, corrections to the master clock are not solved for. Clock states for the other clocks are corrections to master clock time.

Since 1990, a composite clock, known as the Implicit Ensemble Mean (IEM), has replaced the master clock arrangement for GPS operations. The IEM composite clock uses a weighted linear combination of clocks, located both in space and on the ground to define "GPS time". The IEM composite clock decreases the sensitivity of GPS time to the behavior of single clocks. The IEM composite clock applies weights associated with space and frequency estimates provided by a Kalman filter that solves for positions and velocities of the GPS satellites in addition to the clock states of the individual clocks. By changing the weights or contributions of the various clocks to GPS time, the GPS time can be gradually steered to UTC time without significant discontinuities. K. Brown, the developer of the IEM concept of "composite clock", also points out that composite clocks provide better timing and geolocation accuracy than a master clock. Thus, by using a composite clock, the accuracy with which users determine their locations has improved. The argument for improved timing accuracy is that, if each clock is off by a random error, then averaging a group of clocks produces a more accurate estimation of time. If the covariance matrix of errors in all the clock states (phase and frequency) is available, then the IEM composite clock approach uses maximum likelihood estimation with knowledge of the statistical errors of the estimates of phase and frequency of the individual clocks making up the composite to develop the "best" estimate of time by combining time estimates derived from different sources. This covariance is usually not known, as measurements of clocks with respect to absolute time are not available. Since the covariance is unknown, weights are usually chosen arbitrarily, with larger weights assigned to more stable clocks. In addition to Brown, others have used the notation of averaging a set of clocks to produce a more accurate clock.

In the IEM clock it is assumed that a priori clock estimates $\vec{x}_0$ and covariance $P_0$ are given. This information is then used to generate maximum likelihood estimates of "composite clock" states as follows. Define the following set of observations $$\vec{x}_0 = H_c \vec{x}_0^c \quad (16)$$

where $H_c$ is a matrix comprised of 1's and 0's, e.g. for a two clock example $$H_c = \begin{bmatrix} 1 & 0 & 0 & 0 \\ 0 & 0 & 1 & 0 \\ 1 & 0 & 0 & 0 \\ 0 & 0 & 1 & 0 \end{bmatrix} \quad (17)$$

The maximum likelihood estimate of the composite clock is given by $$\vec{x}_0^c = [H_c P_0^{-1} H_c^T]^{-1} P_0^{-1} H_c^T \vec{x}_0 \quad (18)$$

The linear function permits mixing phase states and frequency states, which would occur if there were correlations in the covariance matrix $P_0$. Although these equations, as we indicated above, are applied to the initialization of the filter, it appears new linear combinations could emerge if the composite clock was resolved for at some future time. Brown showed that the linear combination would remain invariant in time under the assumption that the process noise of each clock was proportional to a stability reference standard, a condition that he denoted as "PPN" for proportional process noise. Brown also observed that since all measurements are in time differences, there is now new information that would contribute to an improved estimate of the composite clock. In other words, the composite clock will be driven by a fixed linear combination of outputs of constituent clocks based upon a prior information available when the clocks were initialized FIG. 1a is a simplified block diagram of a prior art Implicit Composite Mean clock, including individual clocks. In FIG. 1a, composite clock 10 includes first (1), $k^{th}$ (k), and nth (n) clocks illustrated as blocks 12, 14, and 16, respectively, which produce individual clock signals $\vec{x}^1$, $\vec{x}^k$, and $\vec{x}^n$, respectively. Blocks 32, 34, and 36 indicate the weights $K_1$, $K_k$, and $K_n$ respectively, by which these clock signals are multiplied, and 22, 34, and 26 designate the corresponding multipliers. Multiplier 22 multiplies the output $\vec{x}^{-1}$ from first clock 12 by gain $K_1$ from block 32. Multiplier 34 multiplies the output $\vec{x}^k$ from $k^{th}$ clock 14 by gain $K_k$ from block 34. Multiplier 26 multiplies the output $\vec{x}_n$ from the $n^{th}$ clock 16 by gain $K_n$ from block 36. Summing (Σ) Block 38 sums the outputs of these signals to produce the composite clock output $\vec{x}^c$. In FIG. 1a, the multiplication constants $K_1$, $K_k$, and $K_n$ from blocks 32, 34, and 36 are scalar values, selected to provide a minimum variance estimate of the initial clock states, based on extrinsic knowledge. The initial setting of the weights, however, does not explicitly address the issue of the stability of the composite clock.

An alternative embodiment of the composite clock is through the use of a master clock and the weighted sum of phase-lock-loops. The use of phase-lock-loops is a prior art practice in order to provide more accurate phase measurements. A phase-lock loop is a standard circuit that is used in communication and signal tracking to measure the frequency and phase offsets between two periodic signals with nearly the same frequency. FIG. 8 is a high-level diagram of a phase-lock loop 600. Two signals, namely S1 and S2, are multiplied in a multiplier 610, and the product signal is filtered by a low pass filter (LPF) 612. The resulting signal is integrated 614 to provide the phase output of the difference of two input signals.

In the arrangement of FIG. 1b, a master clock 52 controls the electronic sampling or reading of the outputs of the other clocks 52', 52". Clock 52' includes blocks 54 and 58, and clock 52" includes blocks 56 and 60. In FIG. 1b, the output signal $\vec{x}^1$ of the master clock 52 is applied directly to the summing (Σ) circuit 38, and is also applied to relative phase counter (RPC) circuits, illustrated as relative phase counter blocks 58 and 60, which control clocks 54 and 56. The output of RPC 58 represents a second clock signal $\Delta \vec{x}^k$, which is applied to a weighting or multiplying circuit 22 for weighting by a factor or coefficient $K_k$ from block 34. The output $\Delta \vec{x}^n$ of RPC 60 is applied to a weighting circuit 26 for weighting by a factor $K_n$ from a block 36. The weighted outputs of multipliers 22 and 26 are applied to summing circuit 38 to produce a composite clock signal $\vec{x}^c$. The master clock 52 measures differences between its time (and/or frequency) and the other clocks 52', 52" in the constellation of FIG. 1b through relative phase counters 58 and 60, and produces composite time by adjusting its own time through a correction provided to summing circuit 38 from master clock 52.

In the arrangement of FIG. 1b, the weightings are applied to the relative measurements between the reference clock 52 and the individual clocks 52', 52", and the weighted differences are summed with the reference clock signal to produce the composite clock signal. The gains $K_k$ and $K_n$ are chosen generally as described in conjunction with FIG. 1a. If the sum of the weights equals 1, the composite clock time will not be sensitive to the stability of the master clock.

The IEM clock embedded within a filter as described by Brown assumes proportional process noise covariances (PPN). In the PPN case, clocks have similarly shaped stability curves as a function of sample time. FIG. 2 illustrates Allan variances $\sigma^2$ 202, 204, and 206 as a function of sample interval for three individual clocks, such as the clocks of FIG. 1a or 1b. As illustrated in FIG. 2, the values of Allan variance $\sigma^2$ for plots 202, 204, and 206 include a generally flat portion extending between sample intervals $\Delta t_1$ and $\Delta t_2$, together with rising values of $\sigma^2$ below sample interval $\Delta t_1$ and above sample interval $\Delta t_2$. The Allan variance plots 202, 204, and 206 of the three clocks have the same general shape, in that the falling portions, flat portions, and rising portions are generally parallel. Consequently, stability characteristics of every clock can be expressed as a scale factor (λ) times a nominal clock, which serves as a reference stability standard. For example, plot 204 of FIG. 2 can be taken as being the standard (λ=1), in which case the scale factor for plot 202 may be, for example, λ=2 and the scale factor for plot 206 may be, for example, λ=3. In other cases, the PPN assumption does not hold. In particular, PPN does not hold when combining crystal clocks and atomic clocks. Crystal clock and atomic have entirely different stability profiles, e.g. the crystal clock can be more stable for short times, while the atomic clocks are more stable for longer times. Thus, the different portions of the variance curves for non-PPN situations are not necessarily parallel, so proportional scaling cannot be accomplished.

A single clock does not provide an estimate of frequency i.e. time between increments, so that the frequency cannot be known other than through some calibration knowledge of the duration of the clock's "second." The frequency of a clock is inferred from prior or calibrated knowledge of the clock count. However, if more than one clock is present, the combination of outputs can be combined to update an estimate of relative frequency, based upon relative phase measurements. By using a relative measurement of frequency between two clocks obtained by a phase lock loop process, a better estimate of frequency can be obtained by using the measurements of the relative outputs of the clocks. If the clocks are equally stable, an average of the clock readings will provide a more accurate estimate of frequency than that of a single clock.

When plural clocks are available in a composite clock arrangement, the time determination is achieved by adjusting center frequencies and phases to a common standard through the use of cross polling of the clocks by use of a central clock for reference timing; the reference timing is not necessarily used as part of the composite clock output. With distributed systems, like GPS, a master clock can be used in place of a central polling clock. The difference between the use of a master clock and the cross-polling clock is that the master clock defines "time" whereas the cross-polling clock is used to keep a nominal reference or intermediate time, which is updated by corrections. The reference time is corrected by adding the weighted outputs of the differences between reference time and the other clocks of the composite implicit means. In the GPS system, cross polling is achieved through relative clock measurements between spacecraft clocks and clocks on the ground or by relative clock measurements between space vehicles.

Improved clock weighting for implicit ensemble mean composite clocks is desired that explicitly addresses the need to optimize the stability of the composite clock.

SUMMARY OF INVENTION

A composite clock according to an aspect of the invention includes at least first and second clocks, which are sampled of phase lock loops, driven by a cross polling clock, the outputs of which are combined by a linear weighted average to produce an optimized stable clock reference The weights are chosen based upon stability characteristics of the clocks as measured by their Allan variances. If all the clocks stability are proportional to a reference clock, then the weights are a function of the proportionally constants. If they are not proportional, Kalman filtering techniques are applied to separate out phase and frequency clock contributions and produce a composite clock by combining these components into a composite clock frequency and phase, using different weights for the phase and frequency components. To do this requires the implementation of a Kalman filter that solves for all clocks. Inputs to this Kalman filter include the parameters that characterize the Allan variance curves for all the individual clocks. The composite Kalman filter steers the clock solutions to be with respect to optimum stable composite time. For applications that have already implemented a master clock, another implementation is to augment the filter that solves for the correction between the master clock states and optimum composite time states.

A composite clock according to an aspect of the invention includes at least first and second clocks, each of which is subject to phase and frequency errors, where the phase and frequency errors are uncorrelated. The phase increments and frequency increments from time sample to time sample are measured, and the two increments are combined with weights which are selected to minimize the total random error in the output clock estimate.

An aspect of the invention relates to a composite clock, that includes a plurality of individual clocks, each of the individual clocks producing a clock signal, with the $i^{th}$ clock having known Allan variance curve given by a standard curve times a constant $\lambda^i$. A reading arrangement is coupled to the plurality of individual clocks, for simultaneously reading the clock signals. A composite clock signal processor arrangement is coupled to the reading means and to a source of the variance information, for generating a composite clock signal according to $$\vec{x}^c(t) = \sum_{i=1}^{n} K^{i*}\vec{x}^i(t) \tag{19}$$

where $\vec{x}^c$ =Composite clock state (estimate of phase and/or frequency produced by the composite clock mechanism);

* represents multiplication;

$\vec{x}^i$ is the individual clock states read out by the hardware;

$K^i$ is the gain chosen to optimize the stability of the composite clock, such that $$K^i = (1/\lambda^i) / \left(\sum_{j=1}^{n} 1/\lambda^j\right). \tag{20}$$

In a particular version of this aspect of the invention, the gains of the clocks add to unity (1) in accordance with $$1 = \sum_{i=1}^{n} K_i(t) \tag{21}$$

A composite clock according to another aspect of the invention includes a plurality of individual clocks, each producing a clock signal, and the ith clock having known Allan variance curve given by a standard curve times a constant vector $$\vec{\lambda}^i = \begin{bmatrix} \lambda_x^i \\ \lambda_y^i \end{bmatrix},$$

where $\lambda_x^i$ is the scale factor for short term (phase random walk) stability errors, and $\lambda_y^i$ is the scale factor for long term (frequency random walk) stability errors, e.g.

$$a \text{ var}(i) = \lambda_x^i/t + \lambda_y^i t. \tag{22}$$

The composite clock according to this other aspect of the invention includes a reading arrangement coupled to the plurality of individual clocks, for simultaneously reading the clock signals, and also includes a composite clock signal processor arrangement coupled to the reading means and to a source of the variance information, for generating a composite clock signal, represented by the vector $$\begin{bmatrix} x^c \\ y^c \end{bmatrix},$$

according to $$\begin{bmatrix} \dot{x}^c \\ \dot{y}^c \end{bmatrix} = \begin{bmatrix} y^c + u \\ v \end{bmatrix} \quad (23)$$

where $$\begin{bmatrix} x^c \\ y^c \end{bmatrix}$$

is the phase and frequency;
$x^c$ is the phase;
$y^c$ is the frequency;
u is the estimate of the composite clock phase noise,
v is the estimate of the composite clock frequency noise, and u and v are given by $$\begin{bmatrix} u \\ v \end{bmatrix} = \sum_{j=1}^{n} \vec{K}^j * \begin{bmatrix} \dot{x}_j - y_j \\ \dot{y}_j \end{bmatrix} \quad (24)$$

where $$\begin{bmatrix} x_i \\ y_i \end{bmatrix}$$

are phase and frequency estimates of the ith clock; and the optimized gains are given by $$\vec{K}^i = \begin{bmatrix} K_x^i \\ K_y^i \end{bmatrix} \quad (25)$$

$$K_x^i = (1/\lambda_x^i) \bigg/ \left( \sum_{j=1}^{n} 1/\lambda_x^j \right) \quad (26)$$

$$K_y^i = (1/\lambda_y^i) \bigg/ \left( \sum_{j=1}^{n} 1/\lambda_y^j \right) \quad (27)$$

The above equations conceptualize the optimum stable composite clock. To complete the specification, the quantities on the right hand side of the equation defining the composite clock must be estimated. As a practical matter, digital filtering using Kalman filtering is required to separate estimates of phases and frequencies of the different clocks. Thus, the clock will have two components: an analogue portion consisting of phase lock loops to sample the outputs of individual clocks and a digital filter that will process these outputs to produce estimates of optimum composite clock time. The analogue portion comprises a phase lock loop for each clock. It will sample phase differences between individual clocks and a master clock. These differences are fed to the digital filter that estimates composite time, as well as errors in the individual clocks, correlating them to composite time. The digital filter includes the states of all the individual clocks. All the states are integrated into a single lumped filter, with the individual steps in the filter as described above, as with the implementation of the Master Clock. As with the Master Clock, it is necessary to modify the filter so that it uses the Master Clock to track the reference time. In the Master Clock implementation, this is accomplished through shaping the process noise covariance. In the composite clock, a similar idea is implemented, only using the notion of "optimum composite time" as the reference time. In order to shape the covariance, a different approach is adopted in order to avoid numerical instability. Rather than shaping the process noise before measurements are processed the covariance is shaped by inserting a perfect measurement step after the measurement update. This step will shape the covariance so that when the next measurements are processed, corrections will be made to composite time.

Another implementation that is suitable in the context of the master clock implementation is to add state vectors that correspond to the difference of the master clock and optimum stable composite clock states.

DESCRIPTION OF THE INVENTION

Figure 1A:
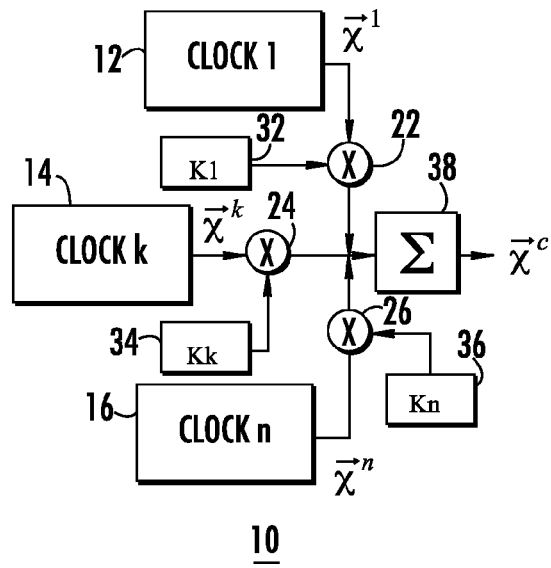
FIG. 1a is a simplified block diagram of a prior art composite clock according to an aspect of the invention for the PPN situation.
Figure 3:
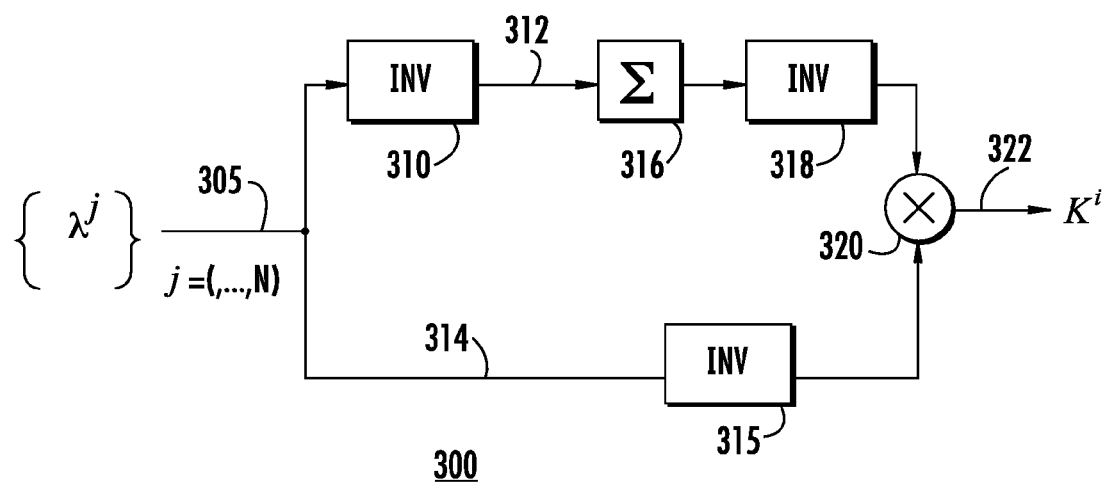
FIG. 3 is a simplified block diagram of a weighting generator which may be used in the arrangements of FIG. 1a or 1b.

The first case, the PPN case, is represented in FIG. 3. In this case a set of scalar factors $\{\lambda^k\}$, which in conjunction with a reference stability standard, defines the stability properties of the clocks within the composite clock. FIG. 3 is a representation of a weighting generator 300 which may be used as any of blocks 32, 34, or 36 of FIG. 1a or blocks 34, 36 of FIG. 1b. In FIG. 3, the fixed vector $\lambda^j$ is applied by way of an input path 305 to an inverting block 310 which inverts the vector to produce output signals on path 312. The original, non-inverted vector $\lambda^j$ appears on path 314 and is inverted by 315. The signals on path 312 are summed over all values of j in a block 316, and the summed signals are applied to a further inverting block 318, which inverts the summed signals. The inverted summed signals from block 318 are applied to an input port of a multiplier 320, and multiplied therein by the inverted $\lambda^j$ from block 315. The multiplied signal, the desired constant $k^i$, is generated on a path 322. The equation representing the process performed in FIG. 3 is given by $$K^i = (1/\lambda^i) \bigg/ \left( \sum_{j=1}^{n} 1/\lambda^j \right) \quad (28)$$

Figure 2:
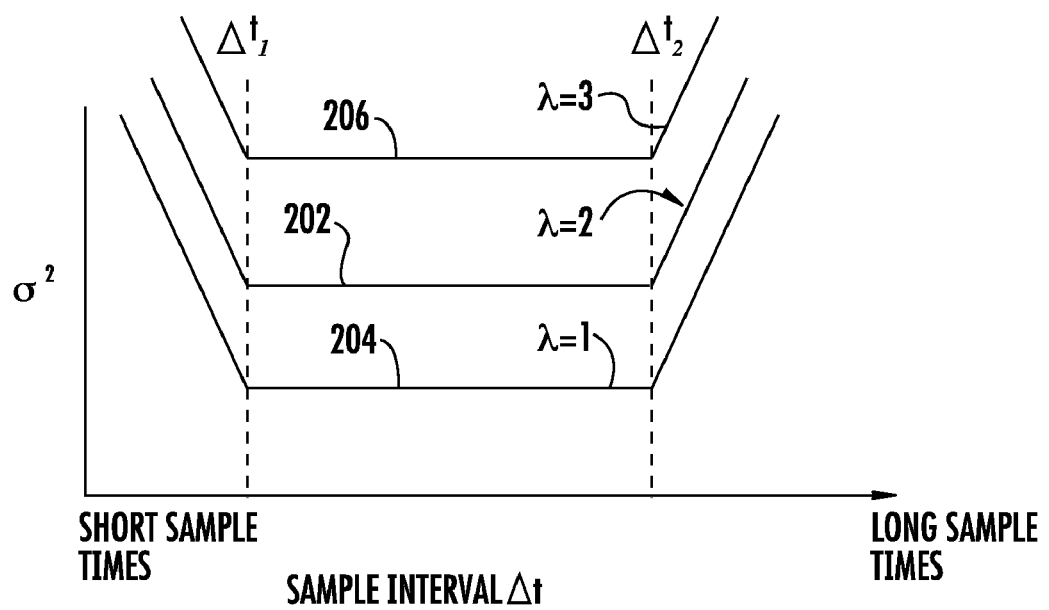
FIG. 2 is a simplified plot of Allan variances for three clocks for the proportional process noise (PPN) situation.

The stability of the weighted average of clock signals in the PPN case described in conjunction with FIG. 2 depends upon the weights (coefficients) and also upon the time interval between read-outs. Minimization of the measure of stability, e.g. Allan deviation, at a point in time determines an optimal set of weights. Clock stability is specified by an Allan variance curve as a function of time differences between consecutive clock samples. In general, the optimum set of weights will depend upon the time interval considered. In the PPN case, the optimal set is independent of the time interval. To see this, one notes that the Allan variance for the weighted average is given by $$\sigma_{wa}^2 = \sigma_r^2(t) \sum_{k=1}^{n} (K^k)^2 \lambda^k \quad (29)$$

where $\pi_r^2(t)$=Allan variance of reference clock. To minimize this it is sufficient to minimize the summation, which is independent of time t.

Let us minimize the right side of equation (29) subject to the constraint given by equation (21). Adding the constraint of equation (21) with the Lagrange multiplier, and setting the first variation to zero yields the relationship $$K^k \propto 1/\lambda^k \quad (30)$$

Thus, the optimal weighting for any value of t is given by the formula:

$$K^k = (1/\lambda^k) \bigg/ \left( \sum_{i=1}^{n} 1/\lambda^i \right) \quad (31)$$

The process noise of the optimum stable composite clock has stability characteristics proportional to the reference stability standard. The constant of proportionality is given by $$\lambda^c = 1 \bigg/ \sum_{i=1}^{n} (1/\lambda^i) \quad (32)$$

The Allan variance of the optimum stable composite clock according to the invention is given by $\lambda^c \sigma_r^2$.

In the PPN case, if individual clocks produce frequency estimates in addition to phase outputs, the composite frequency estimates are produced using the same weights as the phase solutions. The notion of linearly combining weighted outputs of clocks to produce a more accurate clock is not new. A standard procedure is to average the outputs of clocks. If all clocks were equally stable, then the optimum stable clock would be just to average the readouts, which is a common prior art practice. The analysis herein gives a theoretical method for the engineer to determine how to choose the weights optimally to produce the "best clock" (most accurate or most stable). Any other choice of weights produces a less stable clock.

In the more general case, the Allan variance curves of different clocks are not proportional to a reference stability standard. Allan variance curves usually indicate different noise sources in different regions of time samples. For short times, phase random walk errors dominate; for intermediate times flicker noise errors become more important; for longer times, frequency random walk errors become important. In the PPN case, the stability ratios between clocks have the same ratio for all sample times. In the non-PPN case, one clock (A) may have more accurate long-term stability and less accurate short-term stability than another clock (B). In developing a composite clock one would like to combine them in a way such that clock A is weighted more for long term increments and clock B is weighted more for short term increments. This requires the use of state space models that dissect the various noise sources that contribute to the clock stabilities. Thus a simple weighting combination as in the prior art is not sufficient to produce a composite clock. A more general approach is required.

It has been shown above in conjunction with the discussion of stability of the weighted average of clock signals in the PPN case described in conjunction with FIG. 2 and also in conjunction with the description of the optimal weighting for any value of t and equation (10) that an optimum weighting approach is satisfactory for the PPN case to generate the "optimum stable composite clock" according to the invention, but the non-PPN case will require an optimal synthesis of inputs through a 2n-state Kalman filter, more akin to the master clock concept. However, in this case, the master clock will be replaced by an abstract concept of "optimum composite clock".

In the proportional process noise covariance (PPN) case, the optimum combination of clocks does not depend upon any special structure of the stability reference standard. In the non-PPN case, the combinations will depend upon the structure as it will exploit state-space modeling of clocks.

In the more general (non-PPN) case, the optimum stable clock cannot be generated as a simple weighted linear addition of outputs from simple clocks. This fact can be deduced from the above development, in that in the non-PPN case, the weights that would be needed to minimize the Allan variance stability metric depend upon the time interval considered. Thus the "optimum stable composite clock" for the non-PPN case cannot be constructed as a linear combination of elementary clocks. Another conceptual approach is used to develop the optimum stable clock for the non-PPN case.

As mentioned above, a Kalman filter implementation that solves for all clocks is needed. This is provided by another conceptual approach. This other conceptual approach is provided by viewing clocks as Markov processes and by the application of the Kalman filter. This process will be formulated for simple two state clock models, although more complex models are used in practice. For discrete clocks, consider the following representation for the kth clock $$\vec{x}_{n+1}^k = \Phi_n^k \vec{x}_n^k + \vec{v}_n^k \tag{33}$$

where:

$\vec{x}_n^k$ = The clock state (phase and frequency) of the kth clock at epoch n; and $\Phi_n^k$ = The state transition matrix of the $k^{th}$ clock between epoch n and epoch n+1; and $$\vec{v}_n^k = \begin{bmatrix} \vec{v}_n^k(1) \\ \vec{v}_n^k(2) \end{bmatrix} =$$

Process noise over for the kth clock over the time interval $[t_n, t_{n+1}]$.

The covariance of these errors can be computed from the continuous process noise covariances of the clock, as given by the terms in the 2×2 symmetric matrix:

$$Q_0^k = \begin{bmatrix} q_{11}^k & q_{12}^k \\ q_{12}^k & q_{22}^k \end{bmatrix} \tag{34}$$

These coefficients are chosen to approximate the Allan variance of the real clock according to the equation $$\sigma_k^2(t) = \frac{q_{11}^k}{t} + q_{12}^k + q_{22}^k t/3 \tag{35}$$

The discrete process noise used in the Kalman filter is given by the matrix $$Q^k(\Delta t) = \begin{bmatrix} Q_{11}^k & Q_{12}^k \\ Q_{12}^k & Q_{22}^k \end{bmatrix} = \begin{bmatrix} E[v_n^k(1)^2] & E[v_n^k(1)v_n^k(2)] \\ E[v_n^k(1)v_n^k(2)] & E[v_n^k(2)^2] \end{bmatrix} \tag{36}$$

where:

$$\Phi_n^k = \begin{bmatrix} 1 & \Delta t \\ 0 & 1 \end{bmatrix} \tag{37}$$

and $\Delta t$ denotes the discrete time increment;

the subscript n refers to discrete time; and $v_n^k$ represents incremental error vector in changes of errors in phase and frequency over the interval $\Delta t$.

The covariance of these errors can be computed from the process noise variances of the clock.

$$Q_{11}^k = q_{11}^k \Delta t + q_{12}^k \Delta t^2 + q_{22}^k \frac{\Delta t^3}{3} \tag{38}$$

$$Q_{12}^k = Q_{21}^k = q_{12}^k \Delta t + q_{22}^k \Delta t^2/2 \tag{39}$$

$$Q_{22}^k = q_{22}^k \Delta t \tag{40}$$

where:

the small or lower-case q's are coefficients from the continuous process noise covariances.

Once a clock is updated at time n+1, it will produce smoothed estimates $\hat{v}_n^k$ of the process noise. These process noise estimates in a maximum likelihood estimator of phase and frequency estimates will feed the equations for the composite clock provided below.

Figure 1B:
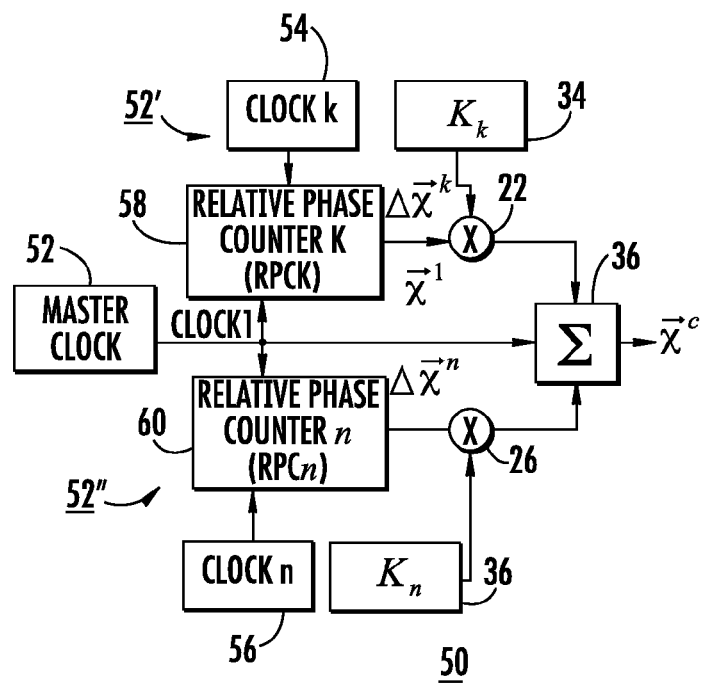
FIG. 1b is a simplified block diagram of an alternative embodiment of a clock according to an aspect of the invention for the PPN situation including weighted sums of relative phase counters.

The structure of the discrete composite clock of FIG. 1b is given by $$\hat{x}_{n+1}^c = \Phi_n^c \hat{x}_n^c + \sum_k M_n^k \hat{v}_n^k \tag{41}$$

$$M_n^k = \left( \sum_j Q_n^{j-1} \right)^{-1} Q_n^{k-1} \tag{42}$$

The propagation of $P_{n+1}^c$ the covariance of the composite clock is given by $$P_{n+1}^c = (\Phi_n^c) P_n^c (\Phi_n^c)^T + Q_n^c \tag{43}$$

$$Q_n^c = \left( \sum_j Q_n^{j-1} \right)^{-1} \tag{44}$$

Equation (14) defines the dynamics of the composite clock state equation $\vec{x}_n^c$. The transition matrix is given by $$\Phi_n^c = \begin{bmatrix} 1 & \Delta t \\ 0 & 1 \end{bmatrix} \tag{45}$$

The matrices $M_n^k$ are provided by Equation (15).

Equations 41, 42, 43, and 44 can be used to compute the stability of the optimum stable composite clock. If the parameters $q_{12}^k$ are zero, then Equation (44) in the limit, as the time sample $\Delta t$ approaches zero, yields the equation $$Q^c = \begin{bmatrix} \frac{1}{\Sigma 1/q_{11}^k} & 0 \\ 0 & \frac{1}{\Sigma 1/q_{22}^k} \end{bmatrix} \tag{46}$$

Equation 18 is useful for performance evaluation of the optimum stable composite clock.

Figure 4:
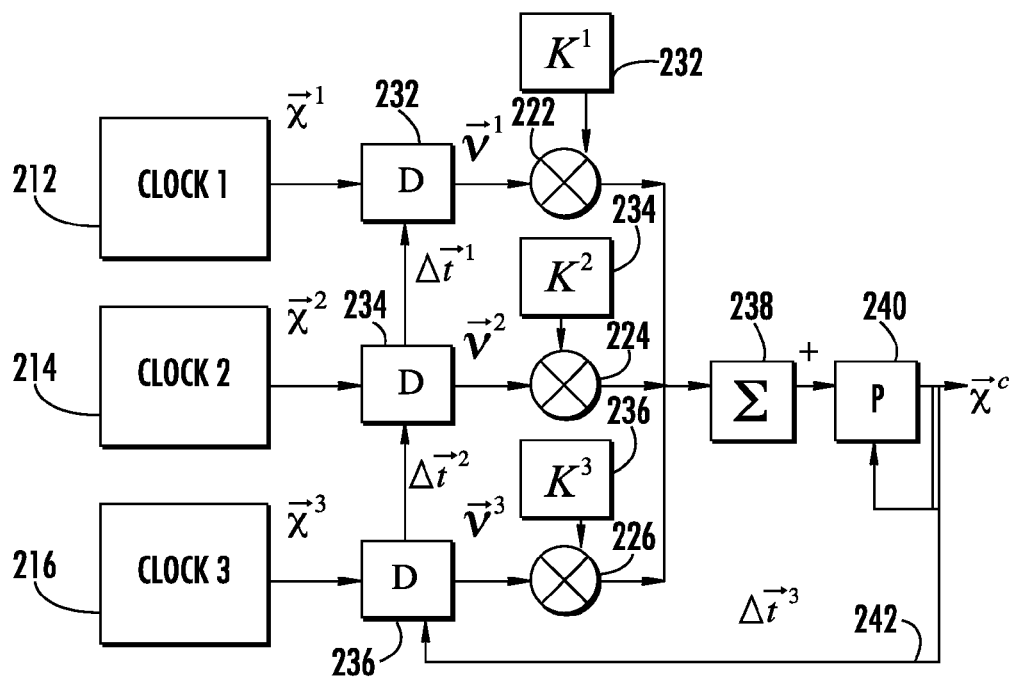
FIG. 4 is a simplified block diagram of the optimum stable composite clock including three clocks, differentiators and a predictor.

FIG. 4 is a simplified diagram of a prior art composite clock arrangement 200 with 3 clocks. In FIG. 4, first (1), second (2) and third (3) individual clocks are illustrated as blocks 212, 214, and 216, respectively. The output signals $\vec{x}^1$, $\vec{x}^2$, and $\vec{x}^3$ from clocks 212, 214, and 216 are applied to differentiating (D) elements 232, 234, and 236, which estimate the various measurement random noises (phase random walk and frequency random walk). These random clock errors (designated by $\vec{v}^1$, $\vec{v}^2$, $\vec{v}^3$, etc.) are sent to three multipliers 222, 224, and 226. Each multiplier 222, 224 and 226 receives a vector of weights, $\vec{K}^1$, $\vec{K}^2$, $\vec{K}^3$, etc. from blocks 232, 234, and 236 respectively. The outputs are then summed by summing block 238 to provide instantaneous values of phase and frequencies. The instantaneous values of phase and frequencies feed a predictor P block 240, which produces the composite clock output $\vec{x}^c$. The predictor 240 of FIG. 4 is illustrated as 300 in FIG. 5, and was described above in conjunction with FIG. 3. The predictor 238 propagates clock states in time. The summer 238 outputs are added to the outputs of the predictor. If it is necessary to correct the clocks to composite time, clock correction $\Delta \vec{t}^1$, etc., states are provided the individual clocks as shown in FIG. 4.

Figure 5:
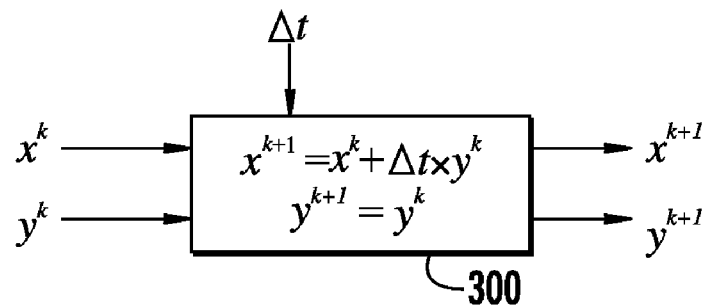
FIG. 5 illustrates the predictor of FIG. 4.

The Prediction block or operator 240 of FIG. 3 is illustrated in FIG. 5. In FIG. 5, predictor block 300 receives the estimates of the phases $x^k$ and frequencies $y^k$, at time k and produces updated estimates at time k+1.

Figure 6:
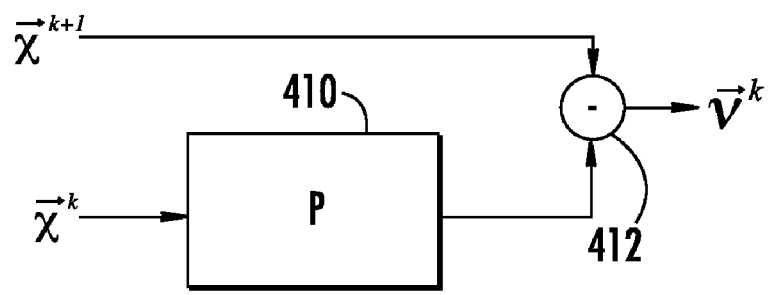
FIG. 6 is a simplified block diagram illustrating a differentiator of FIG. 4.
Figure 7:
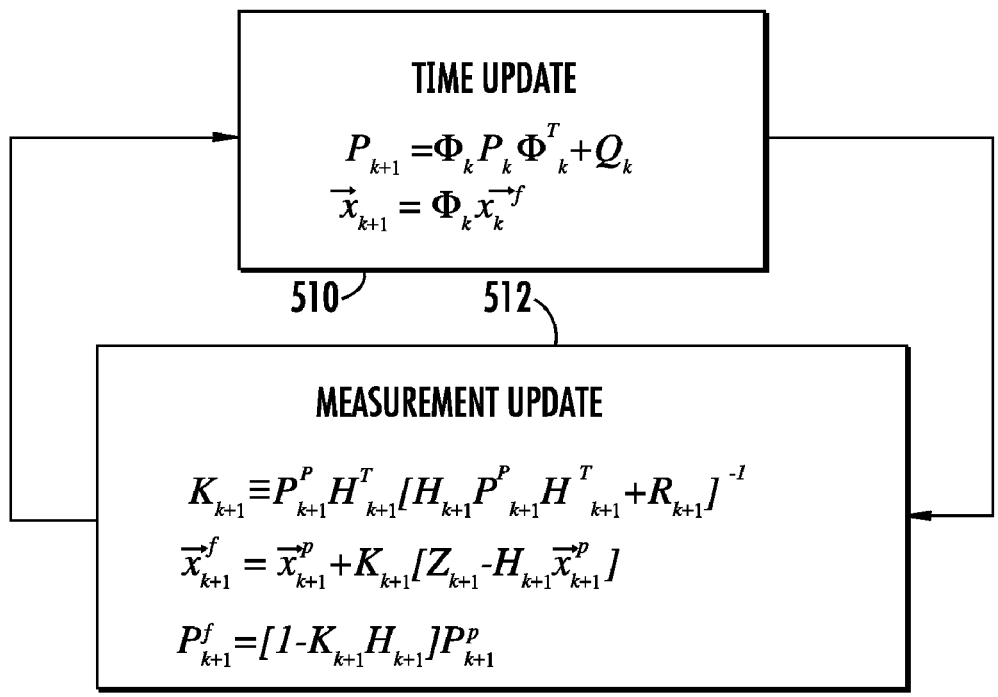
FIG. 7 is a functional diagram of a prior-art Kalman filter.
Figure 8:
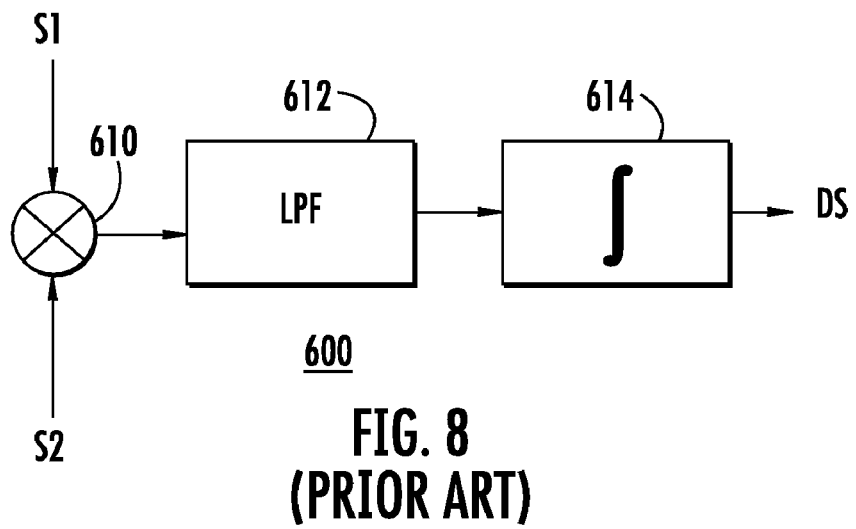
FIG. 8 is a functional diagram of a prior-art relative phase-counter (RPC).

FIG. 6 illustrates details of a differentiator block D of FIG. 4, namely differentiator block 232 for definiteness. The differentiator computes the difference from the measured clock outputs (phase and frequency) and the predicted values in order to provide estimates of the clock errors over a time increment. To do this requires the prediction function. In FIG. 6, nondelayed predicted clock signals $\vec{x}^k$, possibly from a prediction operator 410, and delayed clock signals $\vec{x}^{k+1}$ are applied to a differencing circuit 412 to produce the differentiated output signal $\vec{v}^k$.

The difficulty noted by Brown in applying state space modeling is that absolute time is not observable. Only measurements between clocks are available. So if one tries to solve for all clocks, a singular problem arises that is manifested as numerical instabilities in the filter. To eliminate these numerical instabilities requires a time standard that is not explicitly estimated, as in the case of "master clock". In the implementation of master clock in FIG. 1b, all time tags (reference times provided by the master clock) associated with the master clock are treated as though perfectly known. Hence, clock errors of other clocks are treated as errors relative to the master clock. This leads to the modification of the process noise in the filter. The process noises of different clocks are treated as independent processes. However, once a master clock is introduced, the process noises of clocks become correlated. The same idea applies to the invention, except that in lieu of a master clock is the optimum stable composite clock. The concept is to solve for all clocks relative to "optimum stable composite clock" time. Let us consider the expanded process noise covariance for the expanded set of clocks: one optimum stable composite clock and n clock differences between individual clocks and composite clock. Let the first clock be the optimum stable composite clock. Then the process noise Q* is given by $$Q^* = \begin{bmatrix} Q^c & -Q^c & \cdots & -Q^c \\ -Q^c & Q^1 - Q^c & Q^c & Q^c \\ \vdots & Q^c & \ddots & \vdots \\ -Q^c & Q^c & \cdots & Q^n - Q^c \end{bmatrix} \quad (47)$$

which suggests that composite time can be simply implemented as a Kalman filter with n+1 clocks in the state space. However, there are two problems with that suggestion, namely (a) The process noise Q* is singular, leading to numerical instability, and (b) measurements are only relative between clocks, so n clocks are not observable, leading to a singular estimation problem. These features lead to the numerical stability problem in the prior art implementation of the Kalman filter which is address by the invention (FIG. 4b).

Several approaches are recommended to handle this stability problem. First, it is not necessary to explicitly estimate the states of the optimum composite state, thereby reducing the number of states and particularly eliminating states that are not directly observable. Second, a stable factorization prior art filter is implemented to minimize problems associated with numerical round off (cf. Bierman, "Factorization Method for Discrete Sequential Estimation" (Academic Press, 1977). Third, in an important step that is not found in the prior art, the process noise update/measurement update is modified (block 172 in FIG. 4b). An equivalent perfect measurement update of the covariance step is inserted after the measurement update block 270. The measurement for this update equations are $$0 = \sum_k (Q^k)^{-1}(x^k - x^c) \quad (48a)$$

This results in the covariance update equations as follows:

$$P_4^c = P_3^c - P_3^c H_q^{ct}[H_q^c P_3^c H_q^{ct}]^{-1} H_q^c P_3^c \quad (48b)$$

Here the solution of clock errors will not be changed but the covariance will be shaped to reflect that clock errors relative to the optimum composite clock will be correlated. This step will produce a singular covariance. For added insurance it is recommended that the filter be implemented in the UD factorized form, where the measurement covariance is chosen to be "large". The singularity may cause components of the D matrix to become negative. Thus, these elements should be checked and changed to zero if they are negative.

Figure 4A:
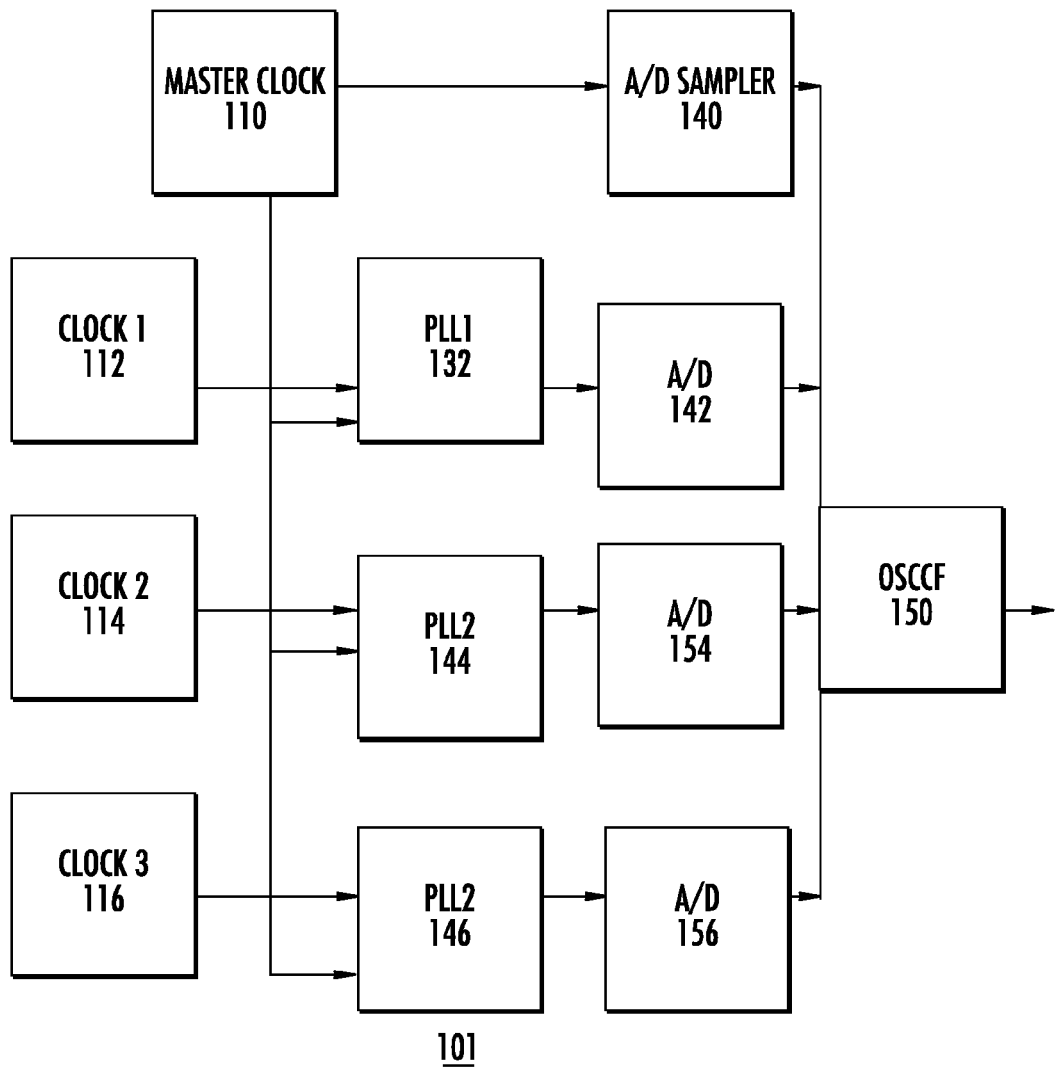
FIG. 4a is a simplified block diagram of a non-PPN clock, with three clocks and the analogue hardware to convert clock signals to digital information. It also includes a block (OC-CDF, "Optimum composite Clock Digital Filter") which combines digital measurements to produce the composite clock message. The OCCDF is expanded upon in FIG. 4b.
Figure 4B:
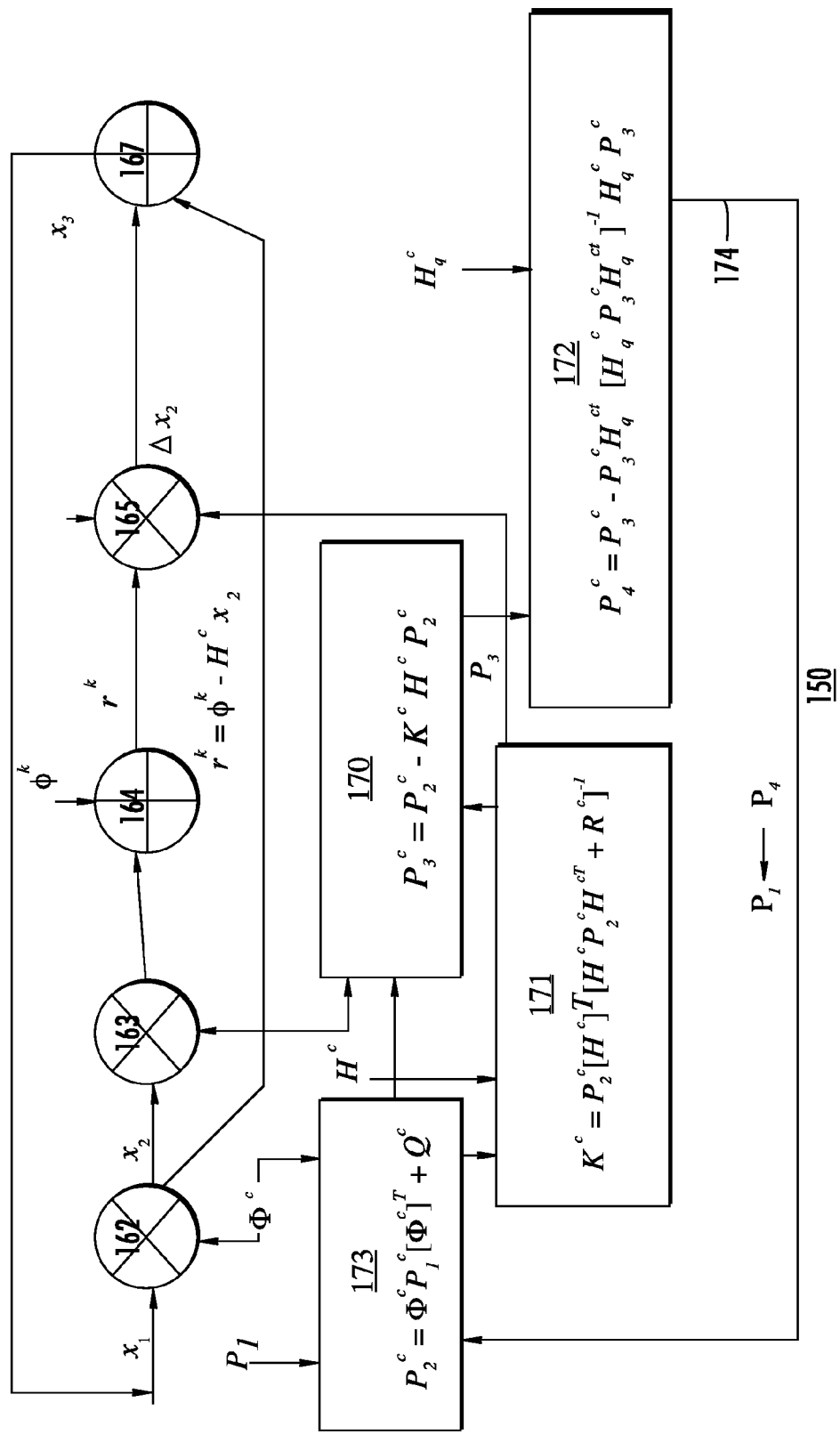
FIG. 4b indicates the digital filtering process required to combine relative phase measurements of individual clocks into a single composite clock reference. It includes standard steps in the Kalman filter, as well as a step the properly combines measurements to produce estimates of composite phase and frequency

The non-PPN composite clock 101 is characterized with drawings FIGS. 4a and 4b. FIG. 4a illustrates the analogue or analog portion, featuring a master clock 110 and three constituent clocks 112, 114, and 116 of the composite clock 101. The master clock 110 controls the hardware. Each constituent clock 112, 114, and 116 sends its signal to a phase lock loop 132, 134, 136, respectively, which also receive a signal from the master clock 110 to drive the phase lock loops. Analog-to-Digital (A/D) digital samplers 142, 154, and 156, controlled by the master clock, sample outputs from the phase lock loops 132, 144, and 146, respectively. These samples are passed to the Optimum Composite Clock Digital Filter (OC-CDF) 150, along with sampled outputs from the master clock produced by the A/D sampler 140. The OCCDF operates on these inputs to produce a single optimum composite clock signal or individual corrections to the constituent clocks to correct to optimum composite clock time.

Details of the OCCDF of FIG. 4a are illustrated in FIG. 4b. The OCCDF 150 of FIG. 4b consists of a single Kalman filter, in which each clock is modeled according to its stand-alone stability characteristics. Typically, a clock will have two states (phase and frequency) and random phase and frequency noise will be modeled. However, extra states may be included as warranted by special situations, as when a special flicker noise model will be included. For each clock, a transition matrix and process noise model (as a stand-alone clock) is required. The process noise model will usually require at least two parameters, although three may be specified. The time propagation will map the state and covariance with a full transition matrix and process noise covariance matrices that are block diagonal matrices. For three clocks, they are:

$$\Phi^c = \begin{bmatrix} \Phi^1 & 0 & 0 \\ 0 & \Phi^2 & 0 \\ 0 & 0 & \Phi^3 \end{bmatrix} \quad (49)$$

$$Q^c = \begin{bmatrix} Q^1 & 0 & 0 \\ 0 & Q^2 & 0 \\ 0 & 0 & Q^3 \end{bmatrix} \quad (50)$$

The constituent clock phase readouts ($\Phi^k$) are treated as measurements. The Jacobian matrix is given for a 3-clock problem by $$H^c = \begin{bmatrix} 1 & 0 & 0 & 0 & 0 & 0 \\ 0 & 0 & 1 & 0 & 0 & 0 \\ 0 & 0 & 0 & 0 & 1 & 0 \end{bmatrix} \quad (51)$$

The measurement covariance is a 3×3 diagonal matrix $$R = \begin{bmatrix} R^1 & 0 & 0 \\ 0 & R^2 & 0 \\ 0 & 0 & R^3 \end{bmatrix} \quad (52)$$

This is the covariance of the readout errors. For many applications, the diagonal elements will have the same value.

The outputs of the composite clock designated in FIGS. 4a and 4b are: 1) state estimates of composite phase and composite frequency $$\left( \vec{x}^c = \begin{bmatrix} x^c \\ y^c \end{bmatrix} \right),$$

and 2) Corrections to individual clocks $$\Delta \vec{x}^k = \begin{bmatrix} \Delta x^k \\ \Delta y^k \end{bmatrix},$$

which correlates clock states to composite time.

The filter cycle requires three steps: the first step is the Kalman filter time update; the second step is the Kalman filter update; the third filter produces an estimate of the composite clock time, as well as shapes the covariance so that the filter will steer the filter to compute clocks relative to composite time. The first two steps are prior art; the third step is new step to generate the optimum composite clock. The third step is equivalent to processing a perfect measurement with the Jacobian $$H_q^C = [Q_1^{-1} Q_2^{-1} Q_3^{-1}] \quad (53)$$

The covariance shaping operation is given by $$P_4 = P_3 - P_3 H_q^T [H_q P_3 H_q^T]^{-1} H_q P_3 \quad (54)$$

Caution: this matrix is singular.

FIG. 4b is a flow diagram that shows the individual steps of the OCCDF 150 of FIG. 4a. In the representation of FIG. 4b, only clock states are presented. For applications such as GPS, where additional systems other than clocks are present, all the steps must be augmented to include more states. Inputs to the process of FIG. 4b include the state vector and covariance matrix. The upper portion of the diagram of FIG. 4b shows the progression of operations of the state vector, while the lower half shows the covariance matrix transformations. Block 162 represents a matrix multiplication that is used to predict or propagate the state vector $x_1$ forward in time by multiplying the state vector by the transition matrix $\Phi^c$ defined in equation (49) to produce a current state vector $x_2$. Block 173 represents the prediction of the state covariance $P_2^c$. The prediction requires two matrix multiplications involving the same transition matrix $\Phi^c$, with the addition of the process noise covariance $Q^c$ (as defined in equation (50). This operation requires the covariance matrix $p_1$, which is initially read into the process but is in subsequent steps replaced by $p_4$. The input quantities ($x_1$, $P_1$) of the prediction process 173 have subscript 1; the output quantities $x_2$, $P_2$ of the prediction process are indicated with subscripts 2. The next steps (164), (165), (167), (170), (171) involve processing the new measurements. The state vector $x_2$ and the $H^c$ matrix (reflecting the connectivity between clocks) are multiplied together in block 163 to form the predicted state measurements; the output of block 163 is subtracted from the measurements $\phi^k$ in block 164 to form the predicted residuals $r^k$. Meanwhile block 171 is used to compute the Kalman gain. This requires the use of the $H^c$ and $R^c$ matrices. Block 165 multiplies the predicted residual $r^k$ and the Kalman gain to compute the state space corrections) $x_2$ to the constituent clocks. Block 167 adds the correction $\Delta x_2$ to compute the updated constituent clock estimates. Block 170 updates the filter covariance according to the measurement update. The subscript 3 is used to denote the output of the prior art post-measurement filter quantities (state estimates and covariances). In the filter process an additional step, illustrated as a block 172, is required to adjust the filter covariance so that future corrections will dictate that clock error estimates are relative to optimum stable composite time. After a single cycle, state estimates and covariances are fed back to the beginning of the filter for repetition of the process, as suggested by path 174 of FIG. 4b.

In the above implementation, no clock is assigned a special role as master clock. Every clock is solved for, thus producing a singular condition. Another implementation of the optimum composite clock that is convenient if the master clock is implemented is to add state variables that correspond to differences between the master clock and optimum composite time. Let us put these state variables at the beginning of the filter. For a three-clock example, the process noise for this filter becomes $$\begin{bmatrix} Q_M - Q_C & Q_M & Q_M \\ Q_M & Q_1 + Q_M & Q_M \\ Q_M & Q_M & Q_2 + Q_M \end{bmatrix}$$

This filter can be partitioned into two parts. The first part consists of the composite clock relative to the master clock (two states) and the second part consists of states related to the individual clocks relative to the master clock (4 states, includes the states for all clocks except for the master clock).

The above process noise matrix is an example with two clocks in the second partition. The second partition is equivalent to the master clock implementation. However, by expanding the filter to include the composite clock, the filter will have added equations to those included in the master filter. The additional equations (as characterized in FIG. 4b) are used to compute the optimum stable composite clock relative to the master clock. These equations consist of a 2×2(N−1) cross covariance, Pxc and a 2×2 covariance, Pc. The time propagation of these matrices are $$P_{xc} = \Phi P_{xc} \Phi_{xc}^T + [Q_M \ldots Q_M] \quad (55)$$

$$P_c = \Phi P_c \Phi^T + [Q_M - Q_C] \quad (56)$$

The measurement update equations are given by expanding the standard equations (of blocks 164, 165, 167, 170, 171).

What is claimed is:

1. A composite clock, comprising:
   a plurality of individual clocks, each producing a clock signal, and the $i^{th}$ clock having known Allan variance curve give by a standard curve times a constant $\lambda^i$;
   reading means coupled to said plurality of individual clocks, for simultaneously reading said clock signals; and
   means coupled to said reading means and to a source of said variance information, for generating a composite clock signal according to $$\vec{x}^c(t) = \sum_{i=1}^{n} K^{i*} \vec{x}^i(t) \quad (57)$$

where
$\vec{x}^c$=Composite clock state (estimate of phase and/or frequency produced by the composite clock mechanism);
* represents multiplication;
$\vec{x}^i$=Individual clock states read out by the hardware
$K^i$=the gain chosen to optimize the stability of the composite clock, such that $$K^i = (1/\lambda^i) \bigg/ \left( \sum_{j=1}^{n} 1/\lambda^j \right). \quad (58)$$

2. A clock according to claim 1, wherein the gains add to unity (1) in accordance with $$1 = \sum_{i=1}^{n} K_i(t). \quad (59)$$

3. A composite clock comprising:
   a plurality of individual clocks, each producing a clock signal, and the $i^{th}$ clock having known Allan variance curve given by a standard curve times a constant vector $$\vec{\lambda}^i = \begin{bmatrix} \lambda_x^i \\ \lambda_y^i \end{bmatrix}; \lambda_x^i =$$

scale factor for short term (phase random walk) stability errors,
$\lambda_y^i$=scale factor for long term (frequency random walk) stability errors,
reading means coupled to said plurality of individual clocks, for simultaneously reading said clock signals; and
means coupled to said reading means and to a source of said variance information, for generating a composite clock signal, the vector $$\begin{bmatrix} x^c \\ y^c \end{bmatrix}$$

according to $$\begin{bmatrix} \dot{x}^c \\ \dot{y}^c \end{bmatrix} = \begin{bmatrix} y^c + u \\ v \end{bmatrix} \quad (60)$$

where $$\begin{bmatrix} x^c \\ y^c \end{bmatrix}$$

is the phase and frequency;
$x^c$ is phase; and
$y^c$ is the frequency,
u is the estimate of the composite clock phase noise,
v is the estimate of the composite clock frequency noise,
and u and v are given by $$\begin{bmatrix} u \\ v \end{bmatrix} = \sum_{j=1}^{n} \vec{K}^j * \begin{bmatrix} \dot{x}_j - y_j \\ \dot{y}_j \end{bmatrix} \quad (61)$$

where $$\begin{bmatrix} x_i \\ y_i \end{bmatrix}$$

are phase and frequency estimates of the ith clock, the optimized gains are given by $$\vec{K}^i = \begin{bmatrix} K_x^i \\ K_y^i \end{bmatrix} \quad (62)$$

$$K_x^i = (1/\lambda_x^j) \bigg/ \left( \sum_{j=1}^{n} 1/\lambda_x^j \right) \quad (63)$$

$$K_y^i = (1/\lambda_y^j) \bigg/ \left( \sum_{j=1}^{n} 1/\lambda_y^j \right). \quad (64)$$

* * * * *